Figure 1:
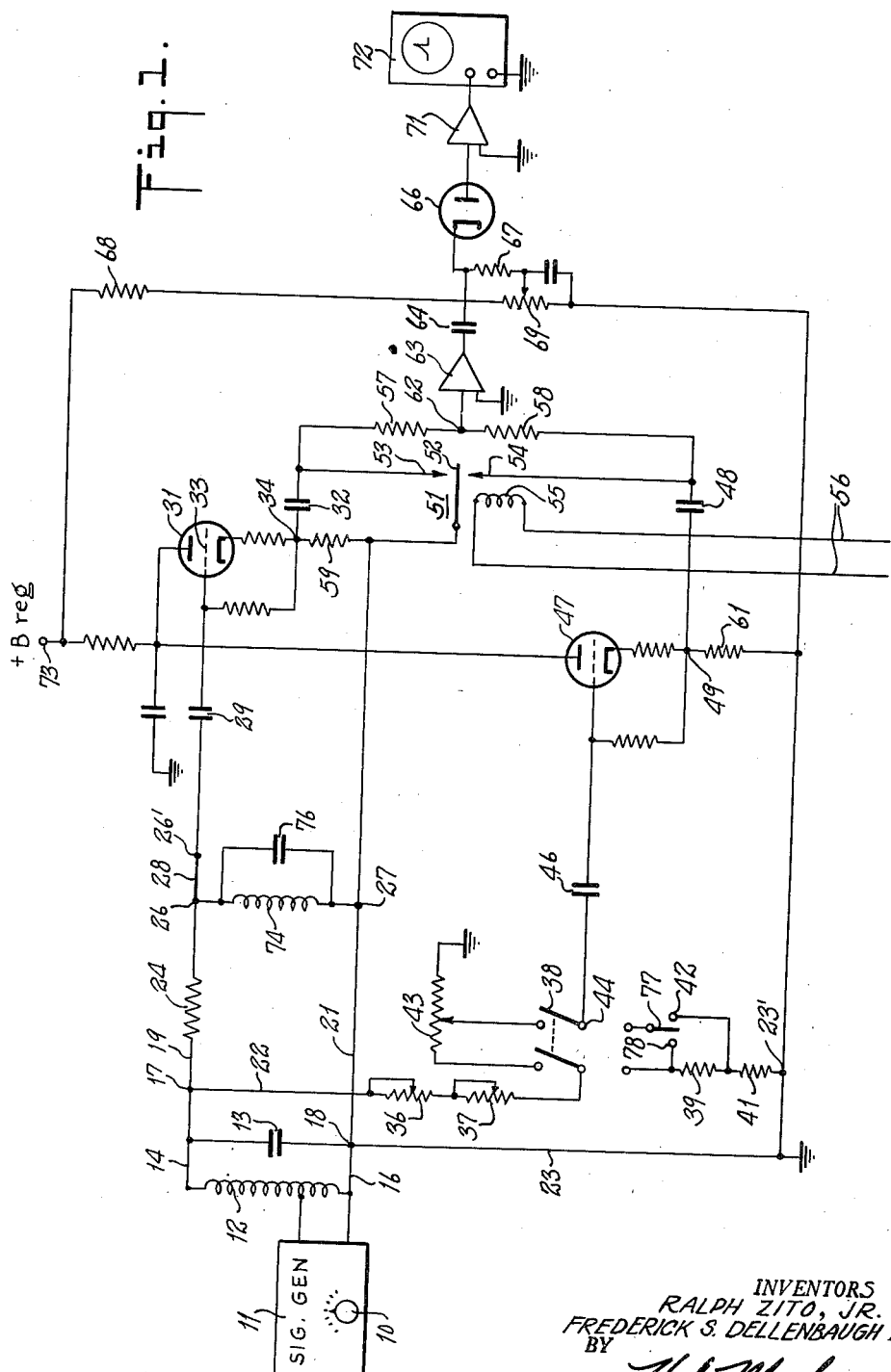

Nov. 6, 1956 R. ZITO, JR., ET AL 2,769,957
COMPARATOR
Filed July 31, 1953
2 Sheets-Sheet 1

INVENTORS
RALPH ZITO, JR.
FREDERICK S. DELLENBAUGH III
BY
H. L. Mackey
ATTORNEY

Nov. 6, 1956 R. ZITO, JR., ET AL 2,769,957
COMPARATOR
Filed July 31, 1953 2 Sheets-Sheet 2

INVENTORS
RALPH ZITO, JR.
FREDERICK S. DELLENBAUGH III
BY
H. A. Mackey
ATTORNEY

_United States Patent Office_

2,769,957
Patented Nov. 6, 1956

2,769,957
COMPARATOR

Ralph Zito, Jr., Mount Vernon, and Frederick S. Dellenbaugh III, Chappaqua, N. Y., assignors to General Precision Laboratory Incorporated, a corporation of New York Application July 31, 1953, Serial No. 371,612

6 Claims. (Cl. 324—57)

This invention relates to comparators for the precise comparison of two electrical quantities.

Comparison of electrical quantities to ascertain resistance or impedance of components, voltage or current conditions, to measure the Q or figure of merit of coils or to measure the band width of filter components, may be made with good accuracy at some frequencies but with less accuracy at others with present measuring instruments. The present invention provides a device which while usable with direct current and with alternating currents of a wide range of frequencies, is particularly useful in a range of frequencies for which no accurate equipment now exists.

The frequency range within which the present invention is useful includes direct current and the range from zero to about ten megacycles per second, or to an upper limit at which the distributed circuit capacitance introduces intolerable uncertainty in the magnitudes of component impedances. The frequency range within which this invention is especially useful is from zero to 40 kilocycles per second.

Briefly, the device consists of two circuit branches fed by the same signal voltage source, one branch for the component under test and the other branch for a known and calibrated substitution component. A vibrator comparator, sometimes called a converter, is used to connect the two branches in alternation to a clipping amplifier. In this amplifier the peaks of the vibrator pulses are amplified, thus accentuating relative peak differences, and these differences are observed on a sensitive qualitative indicator. Thus by the substitution method any desired quality of a component or circuit under test is compared to a standard and may be measured with high accuracy.

The principal purpose of this invention is to provide a device for measuring an electrical quantity by the substitution method.

Another purpose is to measure an electrical quantity of a component by comparing an adjustable electrical quality of the component with that of a fixed standard of reference.

Still another purpose is to measure an electrical quantity pertaining to a component by comparing a quality of the component with the same quality of an adjustable standard of reference.

A further understanding of this invention may be secured from the detailed description and accompanying drawings, in which:

Figure 1 is a schematic wiring diagram of an embodiment of the invention.

Figures 2, 3, 4 and 5 graphically illustrate the operation of the invention.

Referring now to Figure 1, a circuit for measuring the Q of an inductor is shown, Q being defined as the ratio of the inductive reactance of the inductor to its resistance at a selected frequency of applied alternating sinusoidal potential. The circuit also can be used to measure the frequency-impedance characteristic of any two-terminal shunt electrical component or of any three-terminal filter section. The circuit contains two branches, one termed the test branch and the other the reference branch. Both are energized from a single signal source and the two branches are effectively connected in rapid alternation to a single indicator.

In Figure 1 a signal generator 11 is the signal source and generates sinusoidal alternating current the frequency of which is widely and accurately adjustable by means of the control 10 operating in the conventional manner. If the measurement to be performed requires voltage comparison, as the example does, the inputs to the test and reference branches are preferably at impedances comparable to the branch impedances, and if the signal generator output impedance is low, as it usually is, an impedance transformer should be inserted between the signal generator and the branch inputs. In this example impedance transformation is accomplished by an autotransformer 12 having a condenser 13 shunted across its output conductors 14 and 16. The condenser size is selected to resonate at the frequency of test, thus eliminating harmonics, particularly the second harmonic. The autotransformer output terminal conductors 14 and 16 are branched at 17 and 18 to form two separate circuits, one being represented at its input by the conductor 19 and grounded conductor 21, and the other by the conductor 22 and grounded conductor 23.

The test branch contains an isolating resistor 24 which may have a resistance approximately ten times the impedance which is to be measured. Two terminals 26 and 27 are provided for shunt attachment of an unknown impedance which is to be measured. If properties of a T or pi filter section are to be measured the three terminals 26, 26' and 27 are used for connection into the circuit, the strap 28 connecting 26 and 26' being removed. Voltage across the test terminals 26' and 27 is indicated through isolating components consisting of a condenser 29, cathode follower 31, and condenser 32. The voltage developed between the control grid 33 of cathode follower 31 and grounded conductor 21 is represented by the lesser voltage developed between cathode intermediate terminal 34 and conductor 21.

The reference branch contains coarse and fine adjusting rheostats 36 and 37 which in this example may have maximum resistances of 1000 and 500,000 ohms. By means of a double pole, double throw switch 38 either of two calibrated reference resistors may be placed in series between the rheostats 36 and 37, and ground. One calibrated reference resistor consists of two parts 39 and 41 having a total resistance of 10,000 ohms and a resistance between an intermediate tap 42 and the ground conductor 23 of $$\frac{1}{\sqrt{2}}$$

thereof or 7070 ohms. The other calibrated reference resistor consists of a precision voltage divider 43. The voltage between terminal 44 and grounded conductor 23 is indicated through isolating condenser 46, cathode follower 47 and isolating condenser 48, the reduced voltage between cathode tap 49 and ground representing the voltage between terminal 44 and ground.

When in the course of measuring a property of a component connected to terminals 26 and 27 the voltage across terminals 26' and 27 is to be compared with a voltage across terminals 44 and 23', comparison is made by means of a vibrator 51 comprising armature 52, fixed contacts 53 and 54, and actuating coil 55. This coil is excited through conductors 56 from a supply having any desired frequency which does not exceed one half of the signal frequency. A lower limit is imposed only by convenience and other secondary considerations. For example, the commercial frequency of 60 cycles per second may well be employed when the signal frequency is not less than 120 C. P. S. Equal resistors 57 and 58 are connected in series between condensers 32 and 48 and in parallel with vibrator contacts 53 and 54. The resistance of each resistor should be at least ten times the resistance of cathode resistors 59 and 61. The midtap 62 is connected to voltage equality indicating apparatus comprising an amplifier 63, isolating condenser 64, clipper diode 66, clipping bias of which is adjustable by means of resistors 67 and 68, and voltage divider 69, amplifier 71, and oscillograph 72.

The cathode followers and the diode are supplied with positive potential from a source, represented by terminal 73, which should be regulated with an exactness consistent with the degree of accuracy demanded of the comparator.

In the use of this comparator to measure the Q of a coil at 25 kc. p. s. the coil 74 is connected between terminals 26 and 27 with 26 strapped to 26'. A condenser 76 of such size as to resonate with coil 74 at 25 kc. p. s. is shunted across the coil 74. The switch 38 is put in position to place the resistors 39 and 41 in circuit, with switch 77 placed on contact 78 to place resistors 39 and 41, and rheostats 36 and 37 between terminals 17 and ground. Rheostats 36 and 37 are placed at high resistance values. The frequency of the signal generator is set at about 25 kc. p. s.

Figure 2:
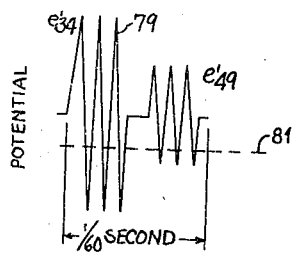

In the operation of the vibrator 51, when the armature 52 is against contact 54 ground is connected to the lower end of resistor 58, so that a potential is developed at the output midterminal 62 representative of the potential of cathode tap 34 and of approximately half of its value. When the armature 52 is against contact 53 the upper end of resistor 57 is grounded and a potential is developed at 62 representative of the potential of cathode tap 49 and of approximately half of its value. The potentials developed relative to ground at terminal 62 during one vibrator cycle are indicated in Fig. 2, in which the potential $e_{34}$ is developed when the vibrator contact 54 is grounded, and the lesser potential $e_{49}$ is developed when the vibrator contact 53 is grounded. The carrier oscillations 79 are at the approximately 25 kc. p. s. frequency of the signal input of signal generator 11.

The signal at terminal 62 as depicted in Fig. 2 is amplified in amplifier 63 and clipped in diode 66, which is so biased as to pass only the most negative peaks of the 120 C. P. S. pulses of Fig. 2 as indicated below the dashed line 81. The remaining signal is inverted in amplifier 71 and applied to oscilloscope 72 where it appears as in Fig. 3. The difference, in the heights of pulses $e'_{34}$ and $e'_{49}$ may be greatly magnified by adjustment of the clipper 66 bias and of the sensitivity control of oscilloscope 72.

In the presence of hum or other modulation the peaks of the oscilloscope 120 C. P. S. pulses may not be at a uniform level and comparison may become difficult. In that case the oscilloscope can be adjusted to sweep at the signal generator frequency, so that single half cycles of the signal frequency will appear on the screen, which it is found facilitates comparison. The screen appearance will then be shown in Fig. 4, each of the peaks 81 and 82 representing repeatedly traced families of curves representing voltage peaks at 34 and 49, respectively.

Figure 4:
Figure 3:
Figure 5:
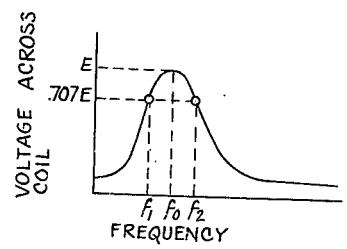

The signal generator 11 is now adjusted in frequency to a maximum height of trace 81, at which point the parallel resonant circuit consisting of coil 74 and condenser 76 is in resonance with the signal frequency. The impedance vs. frequency characteristics curve of coil 74 is shown in Fig. 5, $f_0$ being the resonating frequency. The Q of a coil may be computed from the equation $$Q = \frac{f_0}{f_2 - f_1} \quad (1)$$

in which $f_2$ and $f_1$ are the frequencies at half power points, at which the potential across the coil is $$\frac{1}{\sqrt{2}}$$

times the maximum potential at resonance. In order to ascertain the frequencies $f_2$ and $f_1$, with the switch 77 on contact 78, the rheostats 36 and 37 are reduced in resistance until the peak 82, Fig. 4, is raised to the level of peak 81. The switch 77 is now placed on contact 42, reducing the peak 82 to $$\frac{1}{\sqrt{2}}$$

its former value. The frequency of the signal generator 11 is now increased above $f_0$ until the peak 81 is reduced to the level of peak 82, and the frequency is noted. This frequency of the generator is $f_2$. The frequency of the signal generator is now decreased below $f_0$ until the peak 81 is again reduced to the level of peak 82, and this frequency is noted as $f_1$. By use of Equation 1 the Q of coil 74 may now be calculated.

If the pass band of a filter is to be calculated the filter is connected to terminals 26, 26' and 27, removing the strap from 26 and 26', and switch 38 is actuated so as to put voltage divider 43 into the circuit. By a procedure similar to that described and by adjustment of the voltage divider 43 so that the peaks 81 and 82 are made equal at successive frequency points throughout the range of interest, the fractional voltages developed across the filter may be secured, from which its frequency-voltage characteristic curve may be plotted.

What is claimed is:

1. A device for determining an electrical quality of an electrical component comprising, an adjustable frequency signal generator producing an alternating current output signal, a first branch circuit including said electrical component connected to said signal generator output, a second branch circuit consisting solely of resistive elements and including a calibrated resistor connected to said signal generator output, said first branch circuit including a cathode follower output producing a first output signal the amplitude of which is proportional to the potential developed across said electrical component, said second branch circuit including a cathode follower output producing a second output signal the amplitude of which is proportional to the potential developed across a selected portion of said calibrated resistor, a pair of resistors connected in series between the cathode follower outputs of said first and second branch circuits, a vibrator having an armature connected to a terminal of reference potential common to said first and second branch circuits and a pair of fixed contacts respectively connected to the remote ends of said pair of series connected resistors, means for operating said armature at a frequency not exceeding one-half of the frequency of said alternating current output signal, an amplifier having its input connected to the junction of said series connected resistors and its output connected to energize a deflection circuit of a cathode ray oscilloscope.

2. A device for determining an electrical quality of an electrical component comprising, an adjustable frequency alternating current signal generator, an output circuit therefor, said electrical component being connected in shunt with said output circuit, a triode having its grid connected to one terminal of said electrical component and its cathode connected through an unbypassed cathode resistor to the remaining terminal of said electrical component, a calibrating circuit connected in shunt with said output circuit, said calibrating circuit consisting solely of resistive elements and including an adjustable resistor and a potential dividing resistor connected in series, said potential dividing resistor having an intermediate terminal, a triode having its cathode connected through an unbypassed cathode resistor to one end terminal of said potential dividing resistor and its grid connected to said intermediate terminal, a pair of resistors connected in series between intermediate terminals of said cathode resistors, a vibrator having a pair of fixed contacts each connected to respective opposed end terminals of said pair of series resistors and an armature connected in common to the ends of said cathode resistors remote from the respective cathodes, means for operating said armature at a frequency not exceeding one-half of the frequency of the signal produced by said alternating current signal generator, an amplifier having its input connected to the common junction of said pair of series resistors and its output connected to the deflection circuit of a cathode ray oscilloscope.

3. A device as set forth in claim 2 including means for impressing only the peak amplitude variations of said amplifier output on said cathode ray oscilloscope.

4. A device for determining the Q of a coil comprising, an adjustable frequency alternating current signal generator, an output circuit therefor, said coil being connected in shunt with said output circuit, a triode having its grid connected to one terminal of said coil and its cathode connected through an unbypassed resistor to the remaining terminal of said coil, a calibrating circuit connected in shunt with said output circuit consisting solely of resistive elements and including an adjustable resistor and a potential dividing resistor connected in series, said potential dividing resistor having an intermediate terminal so positioned that the resistance included between said intermediate terminal and one end of the resistor is .707 of the total resistance of said potential dividing resistor, a triode having its cathode connected through an unbypassed resistor to one end terminal of said potential dividing resistor, switch means selectively connecting the grid of said triode to the other end terminal and the intermediate terminal of said potential dividing resistor, a pair of resistors connected in series between intermediate terminals of said cathode resistors, a vibrator having a pair of fixed contacts each connected to respective opposed end terminals of said pair of series resistors and an armature connected in common to the ends of said cathode resistors remote from the respective cathodes, means for operating said armature at a frequency not exceeding one-half of the frequency of the signal produced by said alternating current signal generator, an amplifier having its input connected to the common junction of said pair of series resistors and its output connected to the deflection circuit of a cathode ray oscilloscope.

5. A device as set forth in claim 4 including means for impressing only the peak amplitude variations of said amplifier output on said cathode ray oscilloscope.

6. The method of measuring the Q of a coil comprising, energizing said coil by a signal whose frequency is the resonant frequency of said coil, indicating the potential drop produced across said coil at said resonant frequency, impressing said signal across a resistor, varying the energy applied thereto to produce a potential drop equal to the potential drop across said coil at the resonant frequency of said coil, indicating a potential drop across a portion of the resistor .707 of the whole, reducing the frequency of the signal applied to said coil until the potential drop thereacross is equal to the potential drop across said portion of said resistor, increasing the frequency of the signal applied to said coil above the resonant frequency until the potential drop thereacross is equal to the potential drop across said portion of said resistor, and noting said resonant frequency and said decreased and increased frequencies.

References Cited in the file of this patent

UNITED STATES PATENTS

| | | |
|---|---|---|
| 2,475,179 | Eltgroth | July 5, 1949 |
| 2,649,570 | Radcliffe | Aug. 18, 1953 |
| 2,657,307 | Balde et al. | Oct. 27, 1953 |

FOREIGN PATENTS

| | | |
|---|---|---|
| 569,279 | Great Britain | May 16, 1945 |

OTHER REFERENCES

"The Measurement of Q," by Planer, article in Electronic Engineering of April 1943, pp. 452–456.